United States Patent [19]

Gustafson

[11] Patent Number: 4,754,871

[45] Date of Patent: Jul. 5, 1988

[54] WIRE MESH BELT AND SPLICER

[75] Inventor: Robert C. Gustafson, Stoneham, Mass.

[73] Assignee: Wire Belt Company of America, Winchester, Mass.

[21] Appl. No.: 103,966

[22] Filed: Oct. 5, 1987

[51] Int. Cl.$^4$ .............................................. B65G 15/54
[52] U.S. Cl. ......................................... 198/848; 24/39
[58] Field of Search ....................... 198/848; 24/38, 39

[56] References Cited

U.S. PATENT DOCUMENTS

| | | | |
|---|---|---|---|
| 507,865 | 10/1893 | White | 198/848 X |
| 755,162 | 3/1904 | Olsson | 24/370 |
| 1,895,345 | 1/1933 | Pink | 24/39 |
| 2,826,383 | 3/1958 | Spencer, Jr. | 198/848 X |
| 2,862,602 | 12/1958 | Greer et al. | 198/848 |
| 3,794,155 | 2/1974 | Bechtel, Jr. | 198/848 |
| 4,262,392 | 4/1981 | White | 24/39 X |

OTHER PUBLICATIONS

The Wire Belt Company of America Literature.

Primary Examiner—Robert J. Spar
Assistant Examiner—D. Glenn Dayoan

[57] ABSTRACT

A splicer for wire mesh belts of a plurality of individual zigh-zag strands, adjacent strands interlocked and the belt having first and second ends joined by the splicer to form a continuous web, consists of an elongated wire having a plurality of generally U-shape splicer elements. The splicer elements have a base and upstanding legs at each end lying at obtuse angle to the base, and are arranged in alternating sequence, the base and legs of first elements directed toward the first belt end and the base and legs of adjacent second elements directed toward the opposed second belt end. The splicer also has connectors with arcuate segments adjoining the ends of adjacent legs. First splicer elements engage through and interlock with adjoining links of the first belt end, and second splicer elements engage through and interlock with adjoining links of the second belt end, thereby joining the ends of the belt in a continuous web. In preferred embodiments, the legs of the first elements and the legs of the second elements lie in generally parallel planes vertical to the belt.

5 Claims, 2 Drawing Sheets

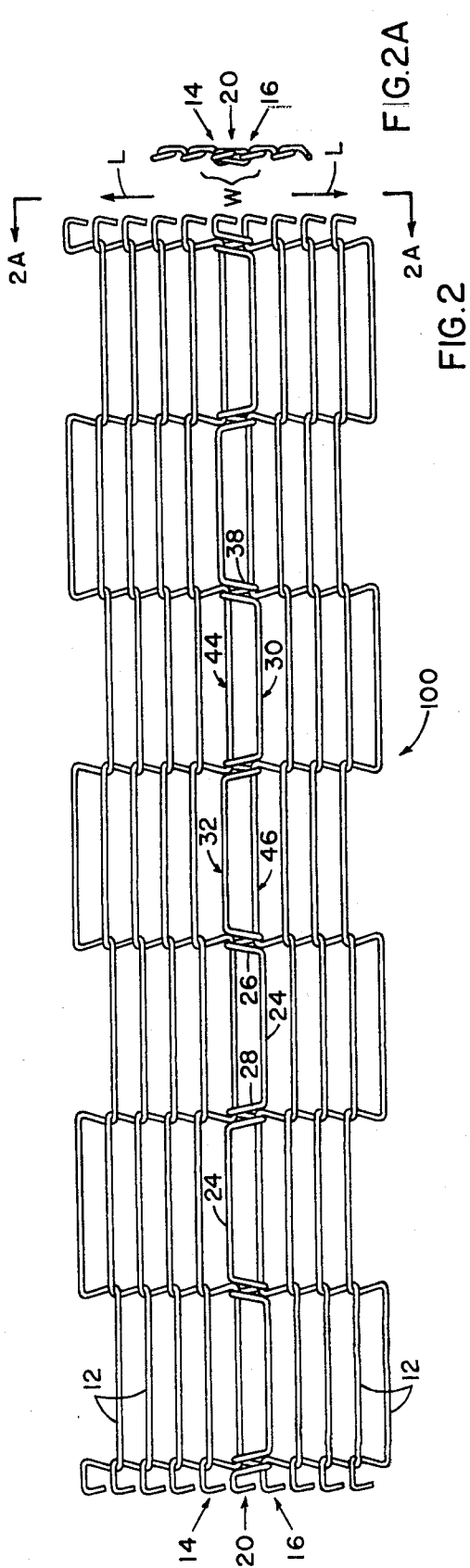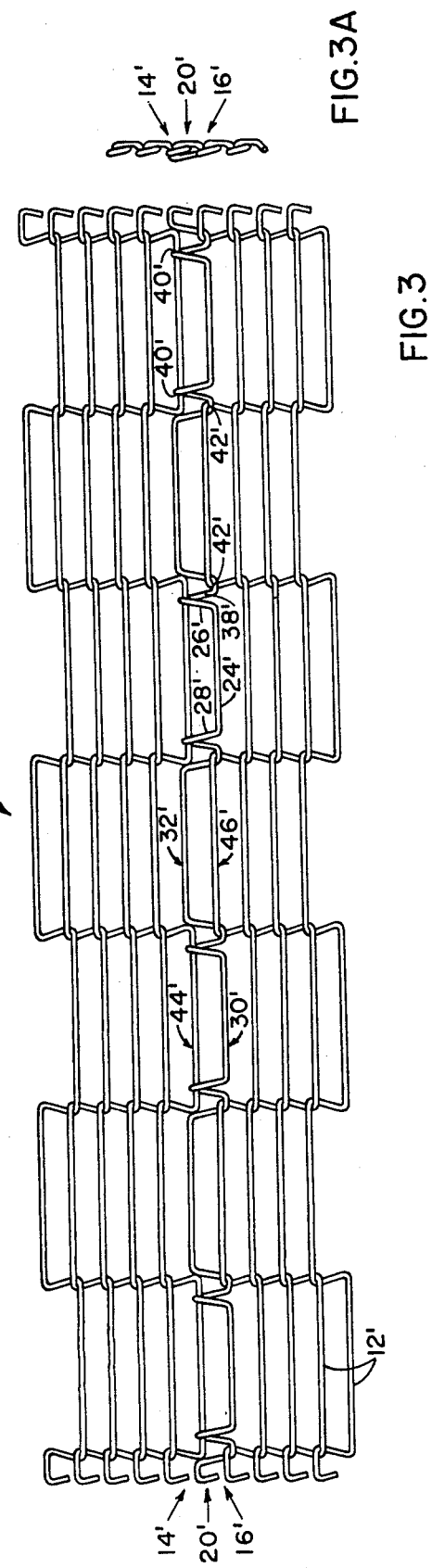

WIRE MESH BELT AND SPLICER

The invention relates to a splicer for wire mesh conveyor belts of the type formed of interwoven zigzag wires used, e.g., for conveying food and other products. Wire mesh conveyor belts are typically selected for the characteristics of open, flow-through mesh, high degree of flexibility, sanitary construction, simple installation and maintenance, and the ability to be positively driven without tracking problems.

The wire conveyor belts are simply constructed by assembling each wire in seguence to the next preceding wire in the assemblage. Splicing the ends of the belt together to form a continuous conveyor belt is a more difficult task reguiring, e.g., that the final wire be interwoven with the opposed ends of the assemblage. Others proposed splicers of different configuration. For example. Pink U.S. Pat. No. 1,895,345 proposed a connector having a center hinge bar. Spencer, Jr., U.S. Pat. No. 2,826,383 suggested short segments joined by coupling sleeves after the short segments were in place. Bechtel, Jr., U.S. Pat. No. 3,794,155 proposed separate connecting links at each end of the belt joined to a linear connector rod. White U.S. Pat. No. 4,262,392 suggested a lateral flat strip having hooks for engaging the ends of the wire belt.

SUMMARY OF THE INVENTION

According to the invention, a wire mesh belt is comprised of a plurality of individual zig zag strands arrayed generally laterally of the belt, adjacent of the strands interlocked in an interlinked relationship, and the belt having a first end and second end opposed thereto joined by a splicer to form a continuous web.

The improved splicer of the invention comprises an elongated wire element having a plurality of generally U shape splicer elements, comprising a base member disposed generally laterally of the belt and, at each end of the base member, a generally upstanding leg portion. Each leg portion lies at an obtuse angle to its respective base member. The U-shape splicer elements are arranged in alternating seguence, the base member and outwardly flaring legs of the first splicer elements directed toward the first end of the belt and the base member and outwardly flared legs of adjacent second splicer elements directed toward the opposed second end of the belt. The splicer further comprises connecting portions integral with the splicer elements and extending between ends of adjacent leg portions, the connecting portions having arcuate segments adjoining the ends of the adjacent leg portions. The first splicer elements are constructed and arranged to be engaged through and interlocked with adjoining links of the first end of the belt, and the second splicer elements are constructed and arranged to be engaged through and interlocked with adjoining links of the second end of the belt, thereby to join the ends of the belt in a continuous web.

In preferred embodiments of the invention, first planes vertical to the belt and including leg portions of the first splicer elements are disposed generally parallel to second planes vertical to the belt and including adjacent leg portions of the second splicer elements, and base members of the splicer elements are disposed in a plane generally parallel to the surface of adjacent portions of the belt. The adjoining links of the ends of the belt have belt base members disposed generally laterally of the belt and, at the ends of the belt base members, generally upstanding belt leg portions lie at acute angles to respective belt base members, and at least first splicer elements of the splicer are constructed and arranged to engage and interlock with adjoining links adjacent the intersection of the belt leg portions with the belt base members. Preferably the first and second splicer elements are constructed and arranged to engage and interlock with respective adjoining links adjacent the intersections of the belt leg portions with the belt base members.

Other features and advantages of the invention will be apparent for the following description of a presently preferred embodiment and from the claims.

PREFERRED EMBODIMENT

We first briefly describe the drawings.

FIG. 2 is a plan view of the splicer and belt of FIG. 1 interlinked in a continuous spliced web, while FIG. 2A is a side view of continuous spliced belt of the invention taken at the line 2A—2A of FIG. 2; and FIGS. 3. and 3A are plan and side views respectively of another embodiment of a spliced continuous belt of the invention.

Figure 1:
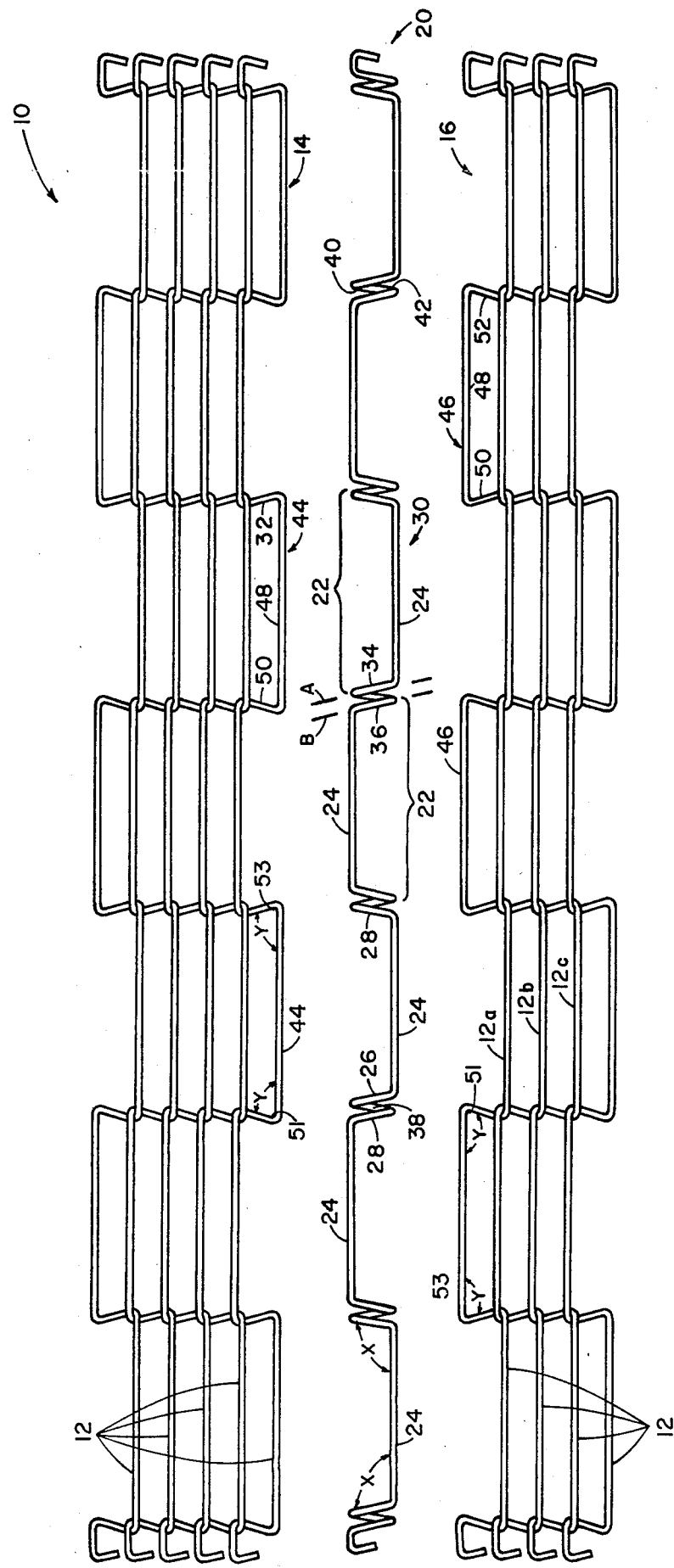
FIG. 1 is a plan view of one embodiment of a wire mesh belt splicer of the invention and the opposed ends of a wire mesh belt.

Referring to FIG. 1, a wire mesh belt 10 consists of a multiplicity of zig zag strands 12 arranged generally laterally of the belt, adjacent strands, e.g., 12a, 12b, 12c, being interlocked in interwoven relationship. The belt, of course, has a first end 14 and a second, opposed end 16 to be joined by means of a splicer 20 of the invention to form a continuous web.

Referring also to FIG. 2, splicer 20 is an elongated wire element having a plurality of generally U shape splicer elements 22. (The splicer element is shown in dark line in this figure, and in FIGS. 2A, 3 and 3A as well, for understanding only.) Each splicer element 22 has a base member 24 disposed generally laterally of the belt, and, at each end of the base member 24, a generally upstanding leg portion 26, 28. Each leg portion is disposed at an obtuse angle, X, to the respective base member. The splicer elements are arranged in alternating seguence, the base member and outwardly flaring legs of a first splicer element 30 directed toward the first end 14 of the belt 10 and the base member and outwardly flaring legs of a second splicer element 32 directed toward the second end 16 of the belt. The adjacent leg portions 34, 36 of the adjacent splicer elements 30, 32 are included in parallel planes, A, B, extending vertical to the horizontal plane, W, of the belt surface (FIG. 2A).

The splicer 20 of the invention further consists of a connecting portion 38 integral with the adjacent splicer elements 30, 32 and extending between the ends of adjacent leg portions 34, 36. The connector portions terminate in arcuate segments 40, 42 adjoining the end of the leg portions.

The links 44, 46 at the ends of the belt 10 have a belt base member 48 disposed generally laterally of the belt and have belt leg portions 50, 52 at each end of the base member. The belt leg portions are disposed at acute angles, Y, to the belt base member at the intersections 51, 53.

The splicer 20 is sized relative to wire mesh belt 10 in a manner whereby to join the ends 14, 16 of the belt 10 into a continuous web 100, the first splicer elements 30 engaging and interlocking with the adjoining links 44 of the first end 14 of belt 10, and the second splicer elements 32 engaging and interlocking with the adjoining links 46 at the second end 16 of the belt 10.

In the preferred embodiment (FIGS. 2 and 2A), the splicer elements 30, 32 are sized relative to links 44, 46 whereby the arcuate segments 40, 42 of the splicer elements engage over the links 44, 46 in the regions of the insections 51, 53 of the belt leg portions 50, 52 and the belt base member 48, thereby to restrict lateral movement of the belt.

Thus the splicer 20 engages the end links of the belt to provide a simpler yet secure splice which resists lateral motion and resists longitudinal disengagement under load forces (arrows, L).

Referring again to FIG. 2A, in assembled condition, the base members 24 of splicer 20 are also disposed generally in plane W to provide a uniform belt surface, including in the spliced area.

Other embodiments are within the following claims. For example, in FIGS. 3 and 3A an alternative embodiment of a splicer 20' of the invention is shown, with elements corresponding to the elements described above indicated by the same reference numeral primed.

What is claimed is:

1. In a wire mesh belt comprised of a plurality of individual zig-zag strands arrayed generally laterally of said belt, adjacent of said strands interlocked in an interlinked relationship, and said belt having a first end and second end opposed thereto joined by a splicer to form a continuous web, the improvement wherein
   said splicer comprises an elongated wire element having a plurality of generally U shape splicer elements,
   said U-shape splicer elements comprising a base member disposed generally laterally of said belt and, at each end of said base member, a generally upstanding leg portion, each said leg portion lying at an obtuse angle to its respective base member,
   said U-shape splicer elements arranged in alternating seguence, the base member and outwardly flaring legs of the first said splicer elements directed toward said first end of the belt and the base member and outwardly flared legs of adjacent second said splicer elements directed toward said opposed second end of the belt,
   said splicer further comprising connecting portions integral with said splicer elements and extending between ends of said adjacent leg portions, said connecting portions having arcuate segments adjoining the ends of the adjacent leg portions,
   whereby, said first splicer elements are constructed and arranged to be engaged through and interlocked with adjoining links of the first end of said belt, and said second splicer elements are constructed and arranged to be engaged through and interlocked with adjoining links of the second end of said belt, thereby to join the ends of said belt.

2. The wire mesh belt of claim 1 wherein first planes vertical to the belt and including leg portions of the first splicer elements are disposed generally parallel to second planes vertical to the belt and including adjacent leg portions of the second splicer elements.

3. The wire mesh belt of claim 1 wherein base members of said splicer elements are disposed in a plane generally parallel to the surface of adjacent portions of said belt.

4. The wire mesh belt of claim 1 wherein said adjoining links of the ends of said belt have belt base members disposed generally laterally of said belt and, at the ends of said belt base members, generally upstanding belt leg portions lying at acute angles to respective belt base members, and
   at least said first splicer elements of said splicer constructed and arranged to engage and interlock with said adjoining links adjacent the intersection of the belt leg portions with said belt base members.

5. The wire mesh belt of claim 4 wherein said first and second splicer elements of said splicer are constructed and arranged to engage and interlock with respective said adjoining links adjacent the joining of the belt leg portions with said belt base members.

* * * * *